UNITED STATES PATENT OFFICE.

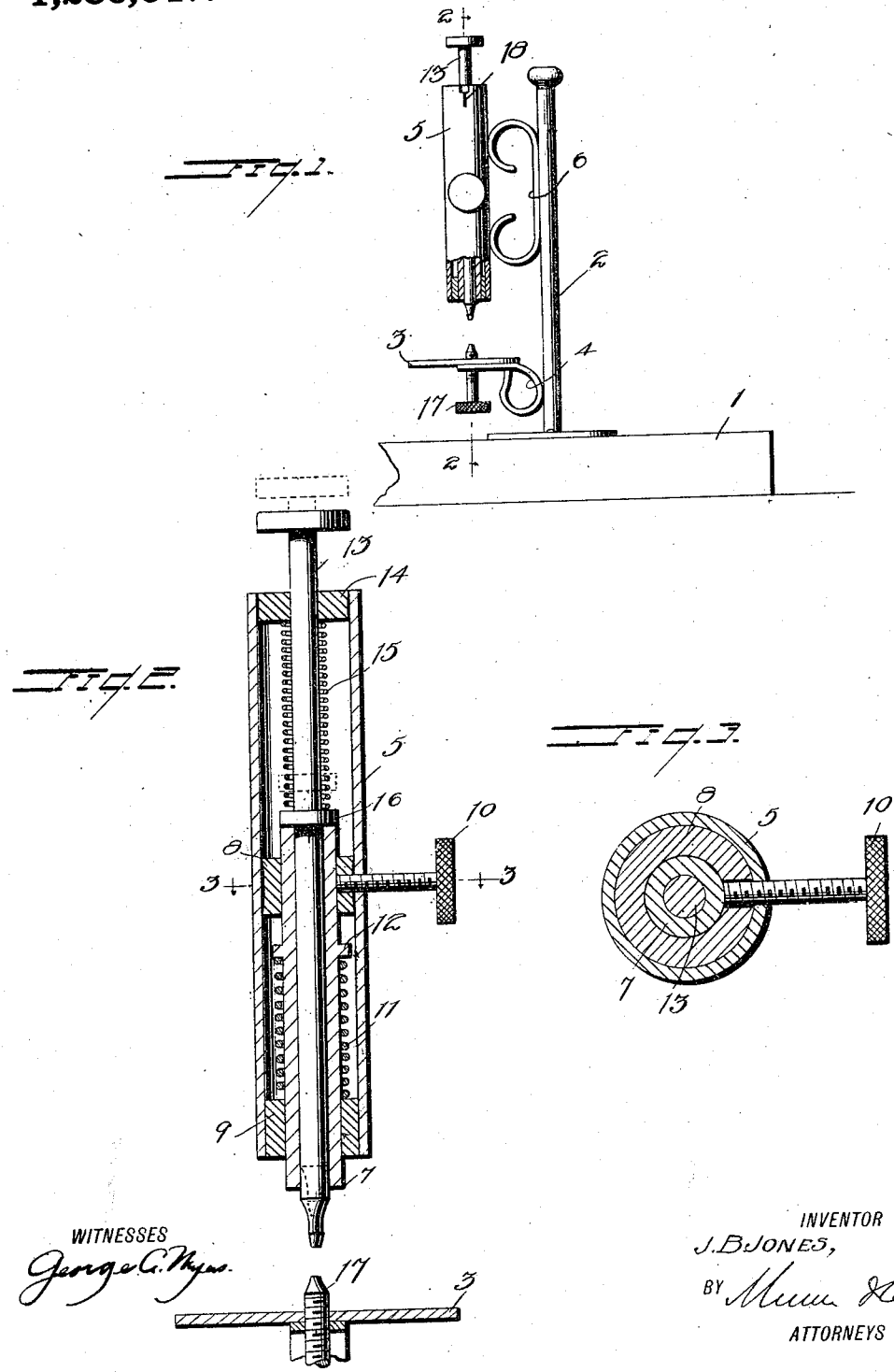

JOHN BERTRAND JONES, OF BROOKVILLE, PENNSYLVANIA.

GAGE.

1,286,647.  Specification of Letters Patent.  Patented Dec. 3, 1918.

Application filed February 15, 1918. Serial No. 217,414.

*To all whom it may concern:*

Be it known that I, JOHN BERTRAND JONES, a citizen of the United States, and a resident of Brookville, in the county of Jefferson and State of Pennsylvania, have invented certain new and useful Improvements in Gages, of which the following is a specification.

My invention is an improvement in gages, and has for its object to provide a device of the character specified especially adapted for jewelers' use, for measuring uneven surfaces.

In the drawings:

Figure 1 is a side view of the improved gage, with parts in section;

Fig. 2 is a section on the line 2—2 of Fig. 1, looking in the direction of the arrows adjacent the line;

Fig. 3 is a section on the line 3—3 of Fig. 2, looking in the direction of the arrows adjacent the line.

In the present embodiment of the invention, a suitable base 1 is provided, and upon this base is mounted a staff or standard 2. The staff or standard supports a table 3 near its lower end, by means of a bracket 4 extending laterally from the staff or standard, and above the table is supported a plunger casing 5 by means of a second bracket 6. These brackets 4 and 6 may be soldered or brazed to the standard. Within this casing is arranged a tubular member 7, the said member being held co-axial with the casing by means of collars 8 and 9 which encircle the tubular member between the same and the casing.

A set screw 10 is threaded through the casing and through the collar 8 into engagement with the tubular member, for fixing the said member, and the tubular member is normally pressed upwardly by means of a coil spring 11 which encircles the same between the collar 9 and an annular rib or shoulder 12 on the tubular member.

The plunger 13 extends through the tubular member and at its upper end the said plunger extends through a collar 14 frictionally held within the casing. A coiled spring 15 encircles the plunger between the collar 14 and an annular rib or shoulder 16 on the plunger, the said spring acting normally to hold the plunger in the position of Fig. 2, that is, with the shoulder or rib 16 abutting the upper end of the tubular member 7.

A set screw 17 is threaded through the table at the center thereof, and the point of the screw and the plunger are adapted to coöperate to gage the article. The upper end of the casing 5 is notched or slotted, as indicated at 18, to frictionally hold the collar 14, and the plunger has a head at its upper end for convenience in manipulating the same.

It will be understood that the terms "cock end and foot end stones" are applied to the cap jewels at the top and bottom of the balance staff. The cockpit is the term applied to the recess in the plate over the balance staff which contains the jewels in which the upper pivot of the balance wheel works. The foot pit is the recess in the plate at the lower end of the balance staff in which the lower pivot of the balance staff works. Each pit, that is, the cockpit and the foot pit, contains two jewels, namely, a hole jewel and a cap jewel, the hole jewel having the opening for the pivot of the balance wheel and the cap jewel capping the end of the hole jewel. In taking the measure for a new balance staff, the cap jewels are removed, and the measure is taken on the outside of the hole jewels, in the position which they occupy when the watch is running.

In use, to measure for a new balance staff, the foot and cock end stones or cap jewels at the top and the bottom of the balance staff are removed, leaving the hole jewels in place. The plunger rod or piston is lifted, until the watch movement may be inserted, that is, until the movement may be passed between the set screw 17 and the plunger rod. The watch is now held in such manner that the jewel rests on the point of the set screw 17, and the piston is dropped into the recess at the top of the balance bearing. The thumb screw 10 is now tightened, and the piston is lifted until the watch movement may be removed. After the movement has been removed, the piston returns to its place, and the distance between the set screw 17 and the bottom of the piston or plunger is the exact length for a new staff. Thus a perfectly accurate measurement can be obtained, for the piston will drop into place under the influence of the spring 15. The position of the piston is gaged by the position of the sleeve or tubular member 7, and a movement of the piston sufficient to release the movement is permitted by the mounting of the same.

I claim:

1. A gage comprising a staff or standard, a base supporting the same, a table supported by the standard, a plunger casing supported by the standard above the table, a plunger mounted to reciprocate in the casing, a tubular member through which the lower end of the plunger slides, said member extending below the casing, a spring normally pressing the tubular member upward, a spring normally pressing the plunger downward, said plunger having a stop for engaging the upper end of the tubular member to limit the downward movement of the plunger, means for fixing the tubular member with respect to the casing, and a set screw threaded through the table for coöperating with the lower end of the plunger.

2. A device of the character specified, comprising a plunger casing and a table, means for supporting the casing above the table, a plunger slidable through the casing, a sleeve encircling the lower end of the plunger and movable into and out of the casing toward the table, a spring normally pressing the sleeve upward, a spring normally pressing the plunger downward, a stop on the plunger for engaging the end of the sleeve to limit the downward movement of the plunger, means for fixing the sleeve with respect to the casing, and means adjustable with respect to the table for coöperating with the lower end of the plunger as a gage.

3. A device of the character specified, comprising a plunger casing and a table supported in spaced relation, a plunger slidable through the casing, a sleeve encircling the lower end of the plunger and movable into and out of the casing toward the table, means for holding the sleeve in adjusted position, a spring normally pressing the plunger downwardly, said plunger having a stop for engaging the sleeve to limit the downward movement of the plunger and extending below the plunger, and means on the table for coöperating with the lower end of the plunger as a gage.

JOHN BERTRAND JONES.

Witnesses:
H. H. Brosius,
E. E. Thompson.

Copies of this patent may be obtained for five cents each, by addressing the "Commissioner of Patents, Washington, D. C."